United States Patent
Chou et al.

(10) Patent No.: US 8,301,792 B2
(45) Date of Patent: Oct. 30, 2012

(54) NETWORK-ATTACHED MEDIA PLUG-IN

(75) Inventors: Randy Yen-pang Chou, San Jose, CA (US); John Richard Taylor, Tiburon, CA (US)

(73) Assignee: Panzura, Inc, San Jose, CA (US)

( * ) Notice: Subject to any disclaimer, the term of this patent is extended or adjusted under 35 U.S.C. 154(b) by 384 days.

(21) Appl. No.: 12/260,034

(22) Filed: Oct. 28, 2008

(65) Prior Publication Data

US 2010/0106849 A1    Apr. 29, 2010

(51) Int. Cl.
G06F 15/16 (2006.01)
(52) U.S. Cl. ......................................... 709/231
(58) Field of Classification Search .................... 709/231
See application file for complete search history.

(56) References Cited

U.S. PATENT DOCUMENTS

| | | | |
|---|---|---|---|
| 6,633,929 B1* | 10/2003 | Hyder et al. | 710/62 |
| 7,849,152 B2* | 12/2010 | Anipindi et al. | 709/217 |
| 2002/0133247 A1* | 9/2002 | Smith et al. | 700/94 |
| 2002/0190876 A1* | 12/2002 | Lai et al. | 341/50 |
| 2003/0028873 A1* | 2/2003 | Lemmons | 725/36 |
| 2003/0045316 A1* | 3/2003 | Tjong et al. | 455/517 |
| 2004/0045030 A1* | 3/2004 | Reynolds et al. | 725/110 |
| 2005/0091311 A1* | 4/2005 | Lund et al. | 709/203 |
| 2005/0172340 A1* | 8/2005 | Logvinov et al. | 726/26 |
| 2005/0195821 A1* | 9/2005 | Yun et al. | 370/392 |
| 2005/0262201 A1* | 11/2005 | Rudolph et al. | 709/205 |
| 2006/0129908 A1* | 6/2006 | Markel | 715/500.1 |
| 2007/0005795 A1* | 1/2007 | Gonzalez | 709/232 |
| 2007/0153827 A1* | 7/2007 | Lee | 370/466 |
| 2007/0162487 A1* | 7/2007 | Frailey | 707/102 |
| 2007/0279494 A1* | 12/2007 | Aman et al. | 348/169 |
| 2008/0046920 A1* | 2/2008 | Bill | 725/34 |
| 2008/0052381 A1* | 2/2008 | Yu | 709/220 |
| 2008/0195698 A1* | 8/2008 | Stefanovic et al. | 709/203 |
| 2008/0235587 A1* | 9/2008 | Heie et al. | 715/719 |
| 2009/0031381 A1* | 1/2009 | Cohen et al. | 725/115 |
| 2009/0037951 A1* | 2/2009 | Candelore et al. | 725/37 |
| 2009/0049189 A1* | 2/2009 | Zhu et al. | 709/231 |
| 2009/0080368 A1* | 3/2009 | Bengeult et al. | 370/316 |
| 2009/0119774 A1* | 5/2009 | Moss | 726/23 |
| 2009/0150930 A1* | 6/2009 | Sherwin et al. | 725/35 |
| 2009/0210899 A1* | 8/2009 | Lawrence-Apfelbaum et al. | 725/34 |

(Continued)

OTHER PUBLICATIONS

Diamond, Tom, "FPOAs Meet the Challenges of H.264 Encoding of High Definition Video", http://www.fpgajournal.com/articles_2007/20070731_mathstar.htm, MathStar, Jul. 2007.

(Continued)

*Primary Examiner* — Imad Hussain
(74) *Attorney, Agent, or Firm* — Park, Vaughan, Fleming & Dowler LLP (57) ABSTRACT

An embodiment is a method and apparatus to provide a network-attached media plug-in. A network interface interfaces with a client and a server. The network interface receives an input from the client requesting content from the server. The client has a network plug-in interface. A network processor extracts a media stream from the requested content. A multimedia processor dynamically modifies the media stream according to the input from the client.

23 Claims, 9 Drawing Sheets

U.S. PATENT DOCUMENTS

| | | | |
|---|---|---|---|
| 2009/0222853 A1* | 9/2009 | White et al. | 725/34 |
| 2009/0232221 A1* | 9/2009 | Cheng et al. | 375/240.24 |
| 2009/0319599 A1* | 12/2009 | Caunter et al. | 709/203 |
| 2010/0088614 A1* | 4/2010 | Barbieri et al. | 715/756 |
| 2010/0146139 A1* | 6/2010 | Brockmann | 709/231 |
| 2010/0325674 A1* | 12/2010 | Liu | 725/92 |
| 2011/0035778 A1* | 2/2011 | Prestoy | 725/93 |
| 2011/0276994 A1* | 11/2011 | Higgins et al. | 725/39 |

OTHER PUBLICATIONS

Richardson, Iain E.G., "Overview of H.264", www.vcodex.com/files/h264_overview_orig.pdf, Jul. 2002.

Wiegand, Thomas, et al., "Overview of the H.264/AVC Video Coding Standard", IEEE Trans. on Circuits and Systems for Video Tech., vol. 13, No. 7, pp. 560-576, Jul. 2003.

* cited by examiner

NETWORK-ATTACHED MEDIA PLUG-IN

TECHNICAL FIELD

The presently disclosed embodiments are directed to the field of computer networks, and more specifically, to network-attached devices.

BACKGROUND

Plug-ins are program modules that are installed as an extension of a host application to extend the functionalities of the host application. Examples of plug-ins include file format support for graphic software and media players, video players for Web browser, etc. The host application typically provides an open application programming interface (API) so that third-party vendors may provide plug-ins to interact with the host application.

Although plug-ins provide extension to the host program in a modular manner, their use has a number of disadvantages. First, the end user may not be sufficiently sophisticated to be able to select the appropriate plug-in to be used for a particular host application. Second, the plug-in has to be installed on the end user's computer, occupying storage space. Third, the end user has to get accustomed to the new features of the plug-in, often going through a long learning curve.

SUMMARY

One disclosed feature of the embodiments is a technique to provide a network-attached media plug-in. A network interface interfaces with a client and a server. The network interface receives an input from the client requesting content from the server. The client has a network plug-in interface. A network processor extracts a media stream from the requested content. A multimedia processor dynamically modifies the media stream according to the input from the client.

BRIEF DESCRIPTION OF THE DRAWINGS

Embodiments may best be understood by referring to the following description and accompanying drawings that are used to illustrate embodiments of the invention. In the drawings.

DETAILED DESCRIPTION

One disclosed feature of the embodiments is a technique to provide a network-attached media plug-in. A network interface interfaces with a client and a server. The network interface receives an input from the client requesting content from the server. The client has a network plug-in interface. A network processor extracts a media stream from the requested content. A multimedia processor dynamically modifies the media stream according to the input from the client.

The network-attached media plug-in is part of a dynamic data processing system that acts as an interface between the client and the server. Since most of the media processing occurs in the network-attached media plug-in, the client does not need to install the applications or the application plug-ins. The client only needs a network plug-in interface to allow the client to interact with the network-attached media plug-in. This network plug-in interface supports low-level basic actions that do not need to change. The network-attached media plug-in is also transparent to the server. Any upgrade or add-on may be made at the network-attached media plug-in, therefore relieving the client the burden of installing or populating upgrade software or application plug-ins.

In the following description, numerous specific details are set forth. However, it is understood that embodiments of the invention may be practiced without these specific details. In other instances, well-known circuits, structures, and techniques have not been shown to avoid obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

Figure 1:
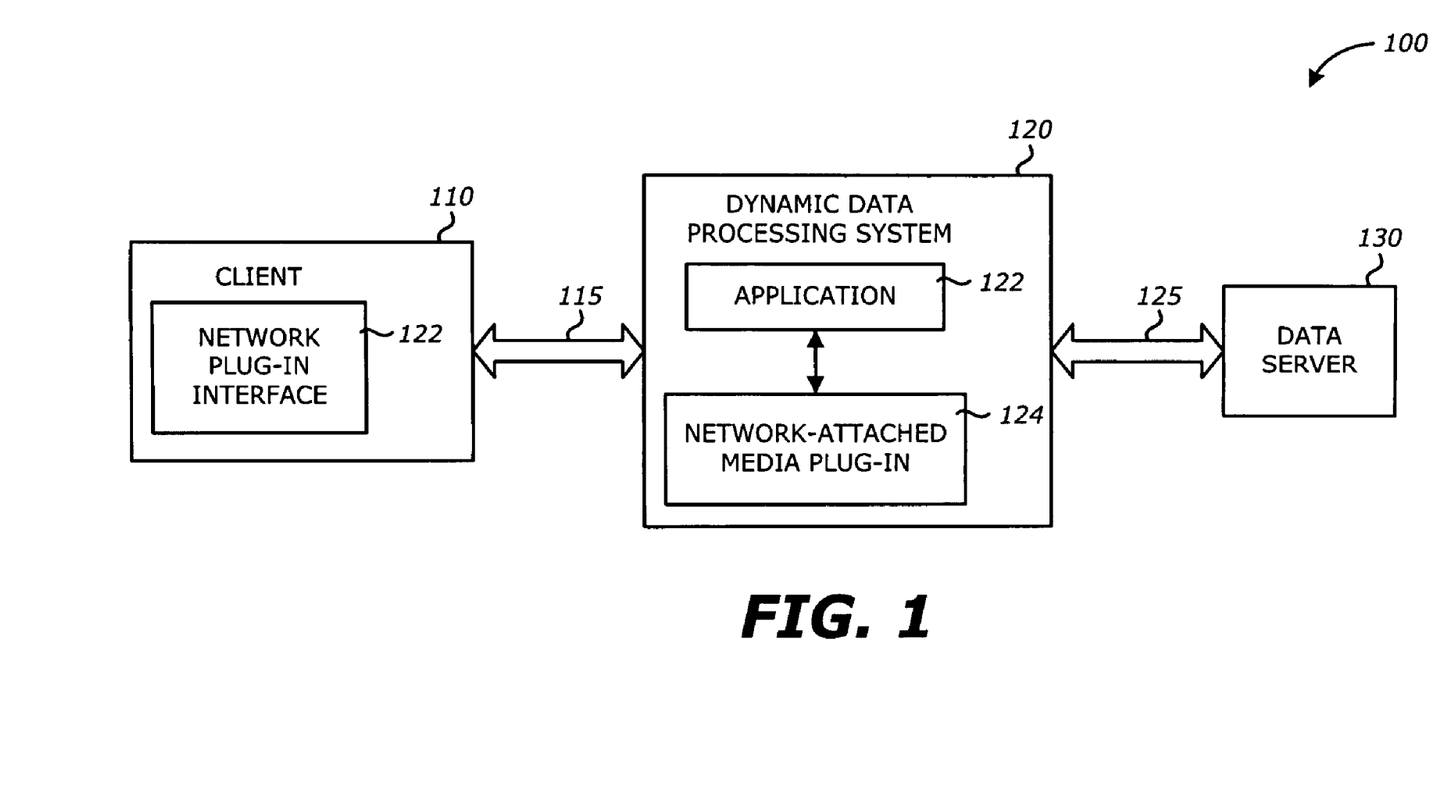
FIG. 1 is a diagram illustrating a system according to one embodiment.

FIG. 1 is a diagram illustrating a system 100 according to one embodiment. The system 100 includes a client 110, a dynamic data processing system 120, and a data server 130. It is noted that the system 100 may include more or less than the above components. The client 110, the dynamic data processing system 120, and the data server 130 communicate with each other via networks 115 and 125 or other communication media. The networks 115 and 125 may be wired or wireless. Examples of the networks 115 and 125 may be Local Area Network (LAN), Wide Area Network (WAN), Metropolitan Area Network (MAN). The networks 115 and 125 may be private or public. This may includes the Internet, an intranet, or an extranet, virtual LAN (VLAN), Asynchronous Transfer Mode (ATM). In one embodiment, the networks 115 and 125 use Ethernet technology. The network bandwidth may include 10 Mbps, 100 Mbps, 1 Gbps, or 10 Gbps. The network medium may be electrical or optical such as fiber optics. This may include passive optical network (PON), Gigabit PON, 10 Gigabit Ethernet PON, Synchronous optical network (SONET), etc. The network model or architecture may be client-server, peer-to-peer, or client-queue-client. The functions performed by the client 110, the dynamic data processing system 120, and the data server 130 may be implemented by a set of software modules, hardware components, or a combination thereof.

The client 110 may be any client participating in the system 100. It may represent a device, a terminal, a computer, a hand-held device, a software architecture, a hardware component, or any combination thereof. The client 110 may use a Web browser to connect to the dynamic data processing system 120 or the data server 130 via the network 115. The client 110 may upload or download files (e.g., multimedia, video, audio) to or from the dynamic data processing system 120. The multimedia files may be any media files including media contents, video, audio, graphics, movies, documentary materials, business presentations, training materials, personal video clips, etc. In one embodiment, the client 110 requests a content from the server 130 and downloads multimedia files or streams from the system 120.

The dynamic data processing system 120 performs data processing on the streams transmitted on the networks 115 and/or 125. It includes an application 122 and a network-attached media plug-in 124. The application 122 is the application that operates on the media streams according to the input from the client 110. It may be a graphics application, a media player, a content management system, etc. Typically, the application 122 has an open application programming interface (API) that provides a standard interface.

The network-attached media plug-in 124 may receive and/or transmit data frames such as media (e.g., video, audio) frames, or bitstreams representing the network frames such as the Internet Protocol (IP) frames. It may un-packetize, extract, or parse the bitstreams from the data server 130 to obtain relevant information, such as media frames. It may encapsulate or re-packetize the processed media frames and transmit to the client 110. It may perform functions that are particular to the applications before transmit to the client 110. For example, it may re-compose the video content, insert additional information, apply overlays, etc. It may interact with the application 122 to obtain the functionalities of the application 122 to operate on the media streams. In addition, it may interact with the client 110 in real-time to modify the media streams based upon the user input at the client 110. It may detect an event, such as a mouse click, a key press, and a cursor adjustment, and responds accordingly. For example, it may move a portion of the content (e.g., overlaid advertisement over a background video) or highlight a portion of the content based upon the location of the mouse within the browser window.

The data server 130 may be any server that has sufficient storage and/or communication bandwidth to transmit or receive data over the networks 115 or 125. It may be a video server to deliver video on-line. It may store, archive, process, and transmit video streams with broadcast quality over the network 125 to the system 120.

Figure 2:
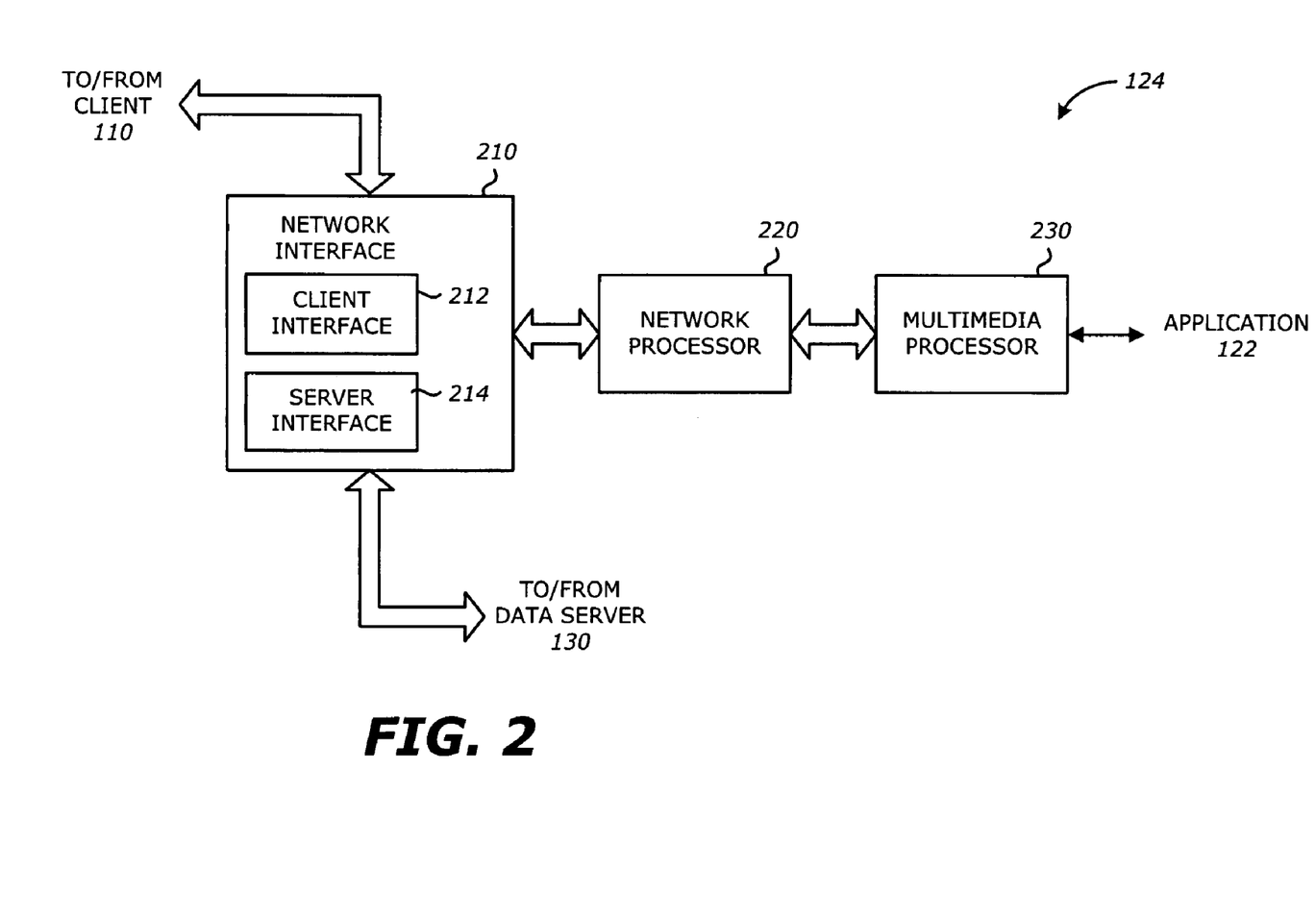
FIG. 2 is a diagram illustrating a dynamic data processing system according to one embodiment.

FIG. 2 is a diagram illustrating the network-attached media plug-in 124 shown in FIG. 1 according to one embodiment. The system 120 includes a network interface unit 210, a network processor 220, and a multimedia processor 230. Note that more than one device for each type may be used. For example, there may be multiple network interface units or network processors, etc.

The network interface unit 210 provides interface to the client 110 and the data server 130. It includes a client interface 212 and a server interface 214. The client interface 212 interfaces with the network plug-in interface 112 in the client 110 via the network 115. The client interface 212 may transfer the recompressed and modified media streams to the client 110.

The server interface 214 interacts with the server 214 via the network 125. It may receive a receive network frame containing the requested content from the server. It may send the receive network frame to the network processor 220.

The network processor 220 performs network-related functions. It may detect and extract media streams from the requested content in the network frames. It may re-packetize or encapsulate the media streams into network frames for transmission to the client 110. It may interact with the client 110 via the client interface 212 in the network interface 210.

The multimedia processor 230 dynamically modifies the media stream according to the input from the client. It may interact with the application 122 to obtain the functionalities of the application 122. It may provide a graphical user interface (GUI) that accommodates the modified media stream according to the platform configuration of the client 110. The multimedia processor 230 is typically a high performance processor, such as a graphic processing unit (GPU) that is optimized for graphics, image, or video operations. It may also be optimized for parallel operations. Parallel operations are operations that may be performed in parallel. It may have a Single Instruction Multiple Data (SIMD) architecture where multiple processing elements may perform identical operations.

Any of the network interface 210, the network processor 220, and the multimedia processor 230, or a portion of them may be a programmable processor that executes a program or a routine from an article of manufacture. The article of manufacture may include a machine storage medium that contains instructions that cause the respective processor to perform operations as described in the following.

Figure 3:
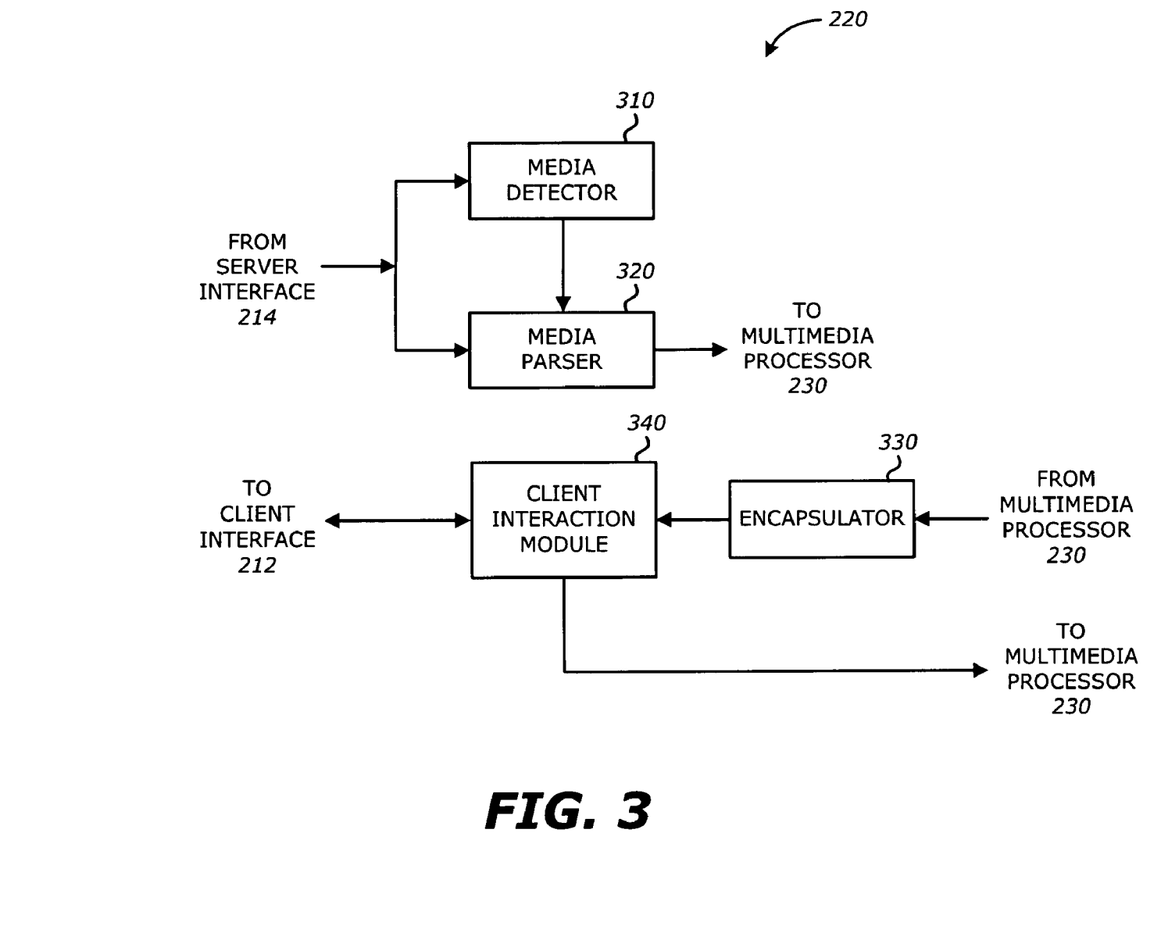
FIG. 3 is a diagram illustrating a network processor according to one embodiment.

FIG. 3 is a diagram illustrating the network processor 220 according to one embodiment. The network processor 220 includes a media detector 310, a media parser 320, an encapsulator 330, and a client interaction module 340. The network processor 220 may include more or less than above components. In addition, any of the components may be implemented by hardware, program instructions stored in a non-transitory computer-readable storage medium, firmware, or any combination thereof.

The media detector 310 detects the media stream in the requested content in the receive network frame. This may be performed by examining the header in the receive network frame. When the media stream is detected to be present in the receive network frame, the media detector 310 instructs the media parser 320 to extract the media stream.

The media parser 320 parses the requested content into the media stream. This may be performed by examining the frame format information or the header information that may contain information on how the bitstreams or the frames are organized. The parsed media stream is then sent to the multimedia processor 230.

The encapsulator 330 encapsulates the modified media stream as received from the multimedia processor 230 into the transmit network frame. This may be performed by re-packetizing the modified media stream into packets with appropriate header and packet information, or any other necessary operations for the transmission of the video frames over the networks 115 or 125.

The client interaction module 340 interacts with the client 110 via the client interface 212 in the network interface 210. For example, it may receive an input from the client 110 or the bitstreams representing network frames from the data server 130. The input from the client 110 may be any input or command sent by the client 110. It may be a selection of a menu item, a click on a toolbar, a parameter or a set of parameters, or a command, or a cursor adjustment. The command may be any video-on-demand (VOD)-related commands such as pause, stop, play, fast-forward, rewind, etc.

The media detector 310, the media parser 320, the encapsulator 330, and the client interaction module 340 may operate in parallel. For example, the media detector 310 and the media parser 320 may operate on the network frame k while the encapsulator 330 may operate on the network frame k−1.

Figure 4:
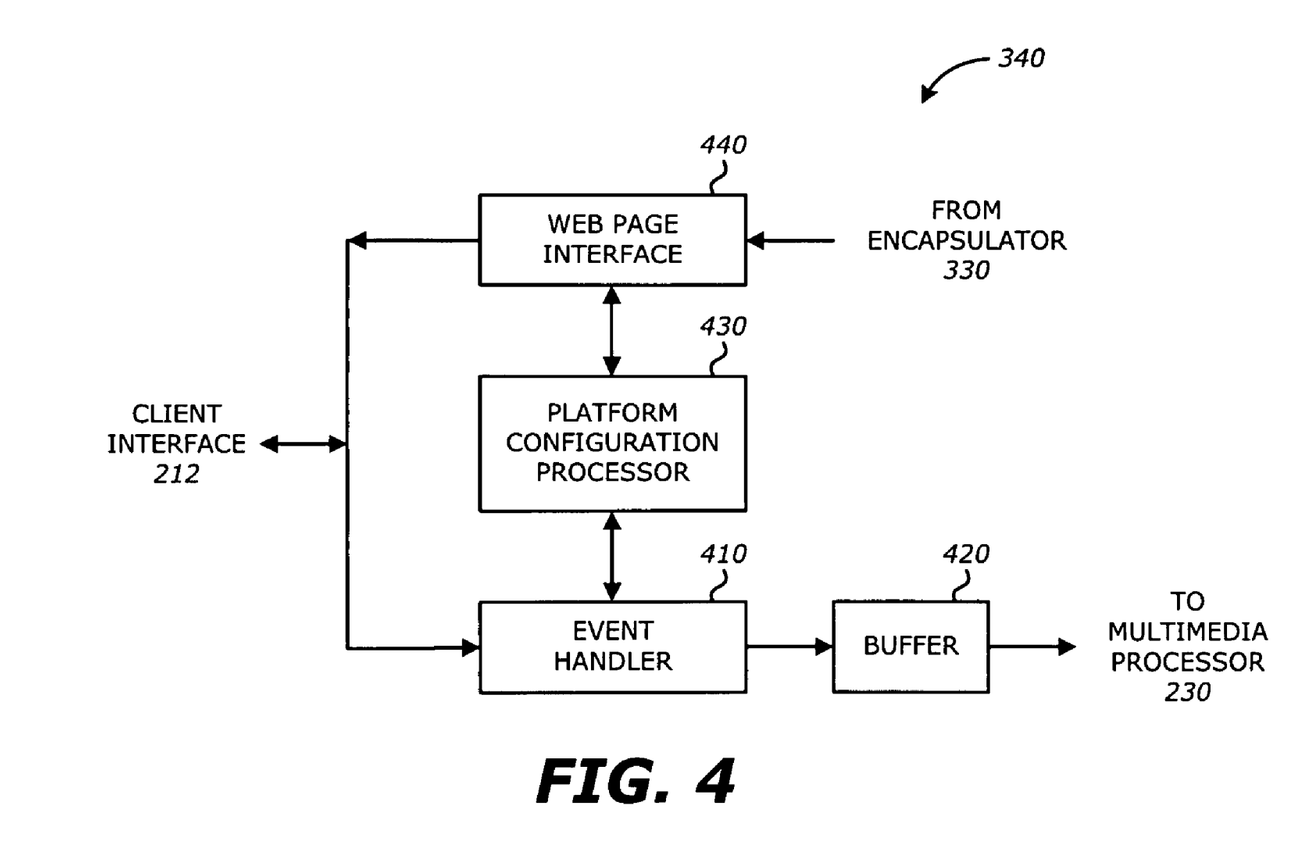
FIG. 4 is a diagram illustrating a client interaction module according to one embodiment.

FIG. 4 is a diagram illustrating the client interaction module 340 shown in FIG. 3 according to one embodiment. The client interaction module 340 includes an event handler 410, a buffer 420, a platform configuration processor 430, and a web page interface 440. The client interaction module 340 may include more or less than the above components.

The event handler 410 handles an event caused by the input from the client 110. The event may be any event triggered by the client input. For example, it may include at least one of a mouse click, a key press, a cursor adjustment. These events may be transmitted from the client 110 to the client interaction module 340 via the network plug-in interface 112.

The buffer 420 buffers the events as provided by the event handler 410 and sends the events to the multimedia processor 230. Since there may be latency in responding to the client inputs, the buffer 420 provides a mechanism to queue the client inputs. The buffer 420 may not be needed if the response is fast enough.

The platform configuration processor 430 configures the platform of the client 110 according to the input from the client 110. The platform may be a Windows, a Mac Operating System (OS), or a UNIX platform. Since an application may operate differently on different platforms, the platform configuration processor 430 provides a way for the network-attached media plug-in 124 to customize or tailor the application accordingly.

The web page interface 440 receives the encapsulated packets from the encapsulator 330 and transmits a transmit network frame containing the modified media stream to the client 110 according to the event and the configured platform.

It is noted that any of the above functions may also be implemented at the network interface 210 or the multimedia processor 230.

Figure 5:
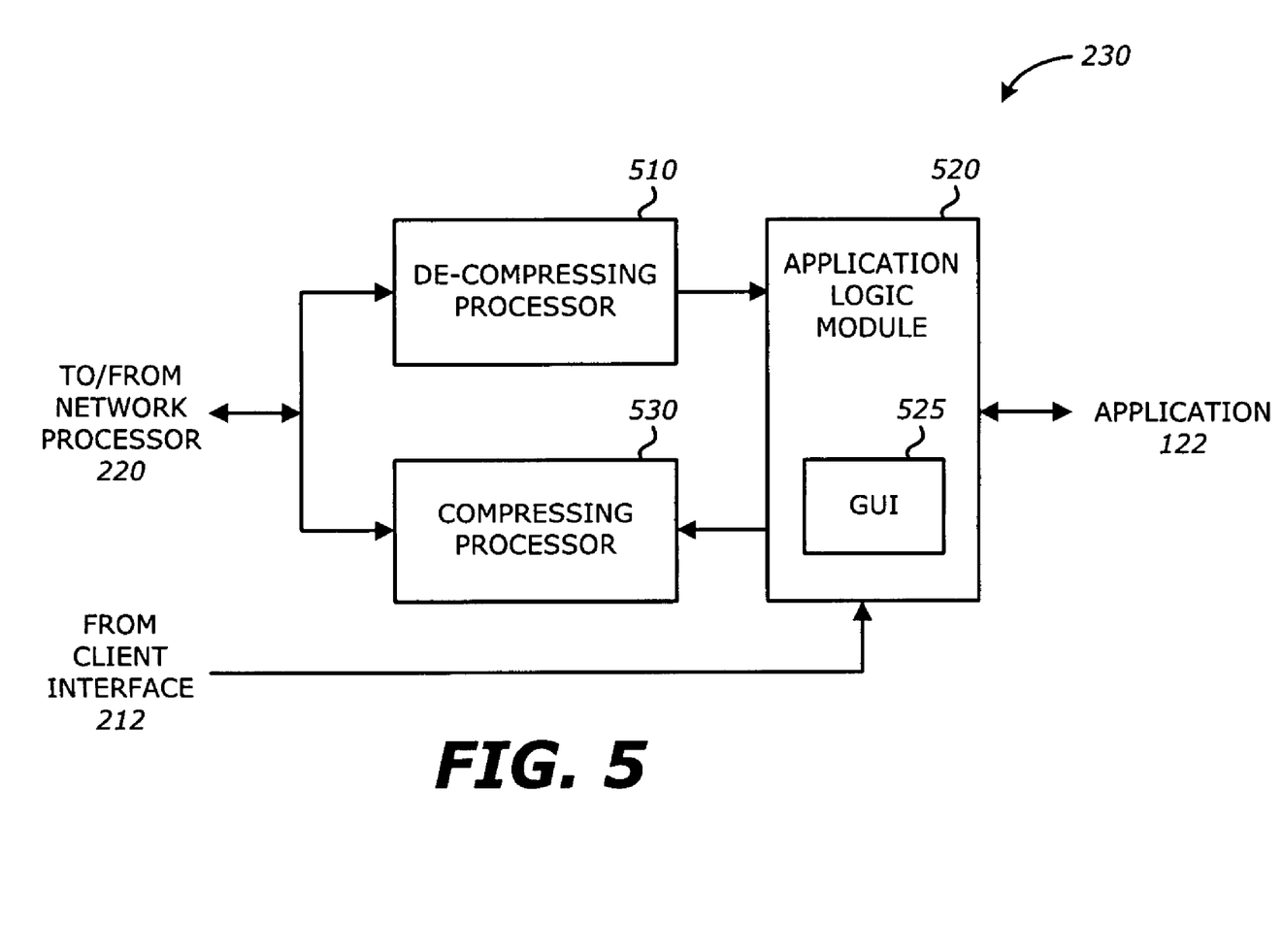
FIG. 5 is a diagram illustrating a multimedia processor according to one embodiment.

FIG. 5 is a diagram illustrating the multimedia processor 230 shown in FIG. 2 according to one embodiment. The multimedia processor 230 includes a de-compressing processor 510, an application logic module 520, and a compressing processor 530. The multimedia processor 230 may include more or less than the above components. In addition, any of the above components may be implemented by hardware, program instructions stored in a non-transitory computer-readable storage medium, firmware, or any combination thereof.

The de-compressing processor 510 de-compress the media stream into a media object according to the decompression format or standard. It may include an entropy decoder (e.g., a run-length decoder, a Huffman decoder), an inverse quantizer, an inverse Discrete Cosine Transform (DCT) processor, and a motion compensator. It may also include an arithmetic coding (AC) decoder such as a context-based adaptive binary arithmetic coding (CABAC) decoder. The media object therefore represents a decoded or de-compressed media stream.

The application logic module 520 may interact with the application 122 (FIG. 1) to dynamically modify the media object. It may add additional information or delete information on the media object. Additional information may include targeted advertisements, moving advertisements, changing characteristics of advertisements or any other necessary information as provided by the input of the client 110. The application logic module 520 may also include a graphical user interface (GUI) processor 525 to provide GUI operations to accommodate the modified object. The GUI may include at least one of a menu, a set of menu commands, a set of toolbars, a set of buttons, and a set of annotations. The modified object is then sent to the compressing processor 530.

The compressing processor 530 compresses the modified media object into the modified media stream according to the compression format or standard. It may include an intra-frame and inter-frame residual calculator, a motion estimator, a DCT processor, a quantizer, a decoder, and an entropy encoder (e.g., a run-length encoder, a Huffman encoder). It may also include an AC encoder such as a CABAC encoder.

In general, the de-compressing processor 510 and the compressing processor 530 are compatible with at least one of an MPEG-2 standard and an H.264 standard.

Figure 6:
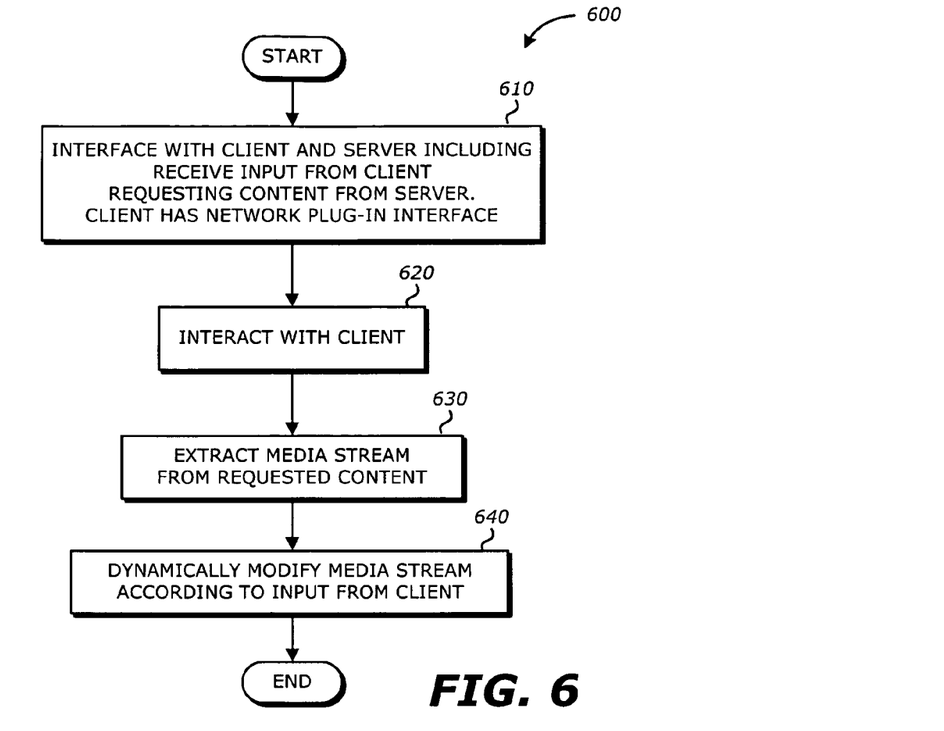
FIG. 6 is a flowchart illustrating a process to provide network-attached media plug-in according to one embodiment.

FIG. 6 is a flowchart illustrating a process 600 to provide network-attached media plug-in according to one embodiment.

Upon START, the process 600 interfaces with a client and a server (Block 610). This may includes receiving an input from a client requesting content from the server. The input from the client may be any input or command sent by the client, such as a selection of a menu item, a click on a toolbar, a parameter or a set of parameters, or a command, or a cursor adjustment. The command may be any video-on-demand (VOD)-related commands such as pause, stop, play, fast-forward, rewind, etc. The client has a network plug-in interface. Next, the process 600 interacts with the client (Block 620). Then, the process 600 extracts a media stream from the requested content (Block 630). Then, the process 600 dynamically modifies the media stream according to the input from the client (Block 640). The process 600 is then terminated.

Figure 7:
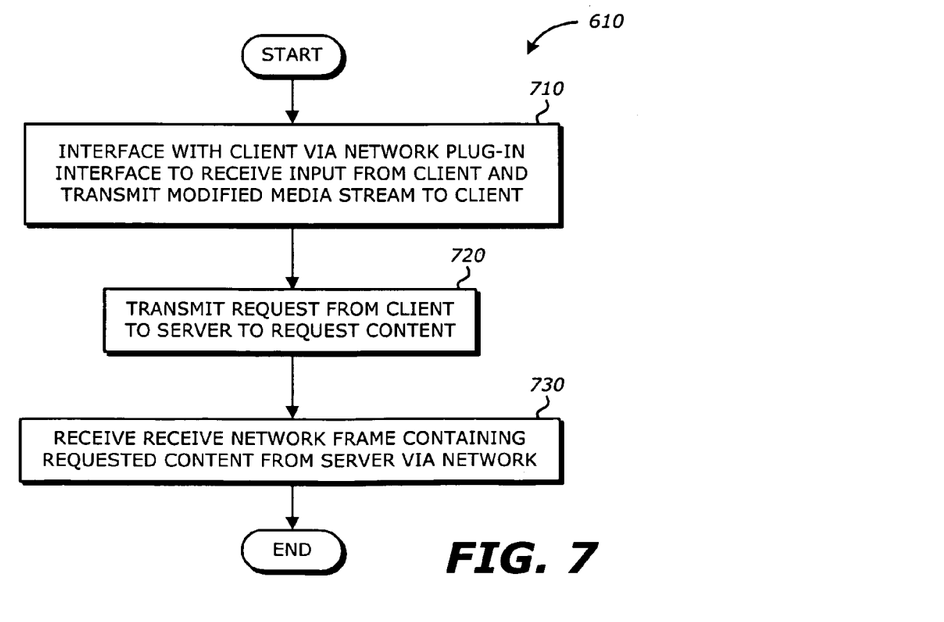
FIG. 7 is a flowchart illustrating a process to interface with the client and the server according to one embodiment.

FIG. 7 is a flowchart illustrating the process 610 shown in FIG. 6 to interface with the client and the server according to one embodiment.

Upon START, the process 610 interfaces with the client via the network plug-in interface to receive the input from the client and transmit the modified media stream to the client (Block 710). Next, the process 610 transmits the request from the client that requests the content to the server (Block 720). Then, the process 610 receives a receive network frame containing the requested content from the server via a network (Block 720). The process 610 is then terminated.

Figure 8:
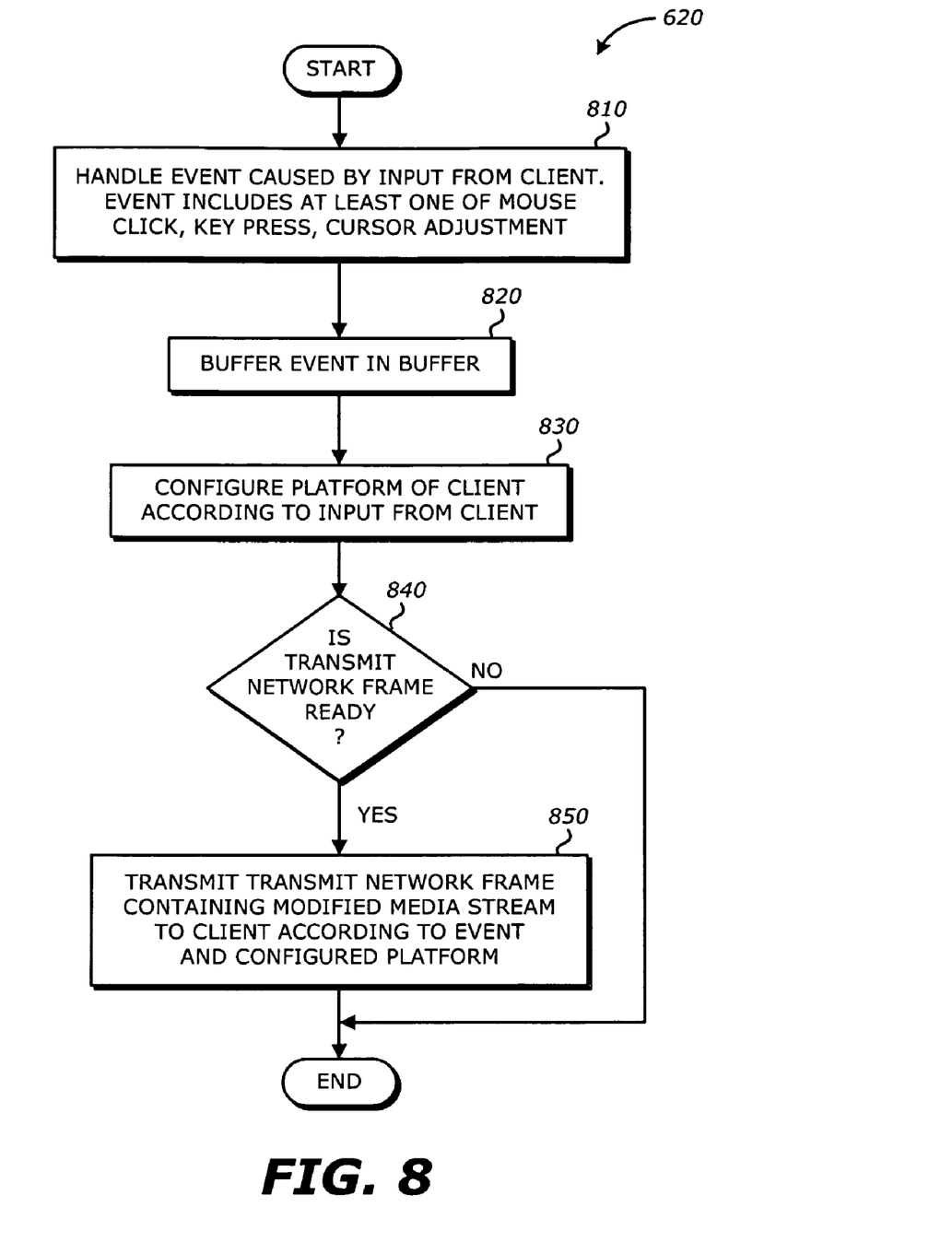
FIG. 8 is a flowchart illustrating a process to interact with the client according to one embodiment.

FIG. 8 is a flowchart illustrating the process 620 shown in FIG. 6 to interact with the client according to one embodiment.

Upon START, the process 620 handles an event caused by the input from the client (Block 810). The event includes at least one of a mouse click, a key press, a cursor adjustment. Then, the process 620 buffers the event in a buffer (Block 820). Next, the process 620 configures the platform of the client according to the input from the client (Block 830). Then, the process 620 determines if a transmit network frame is ready for transmission (Block 840). If not, the process 620 is terminated. Otherwise, the process 620 transmits the transmit network frame containing the modified media stream to the client according to the event and the configured platform (Block 850). This may be performed by encapsulating the modified media stream into the transmit network frame. The process 620 is then terminated.

Figure 9:
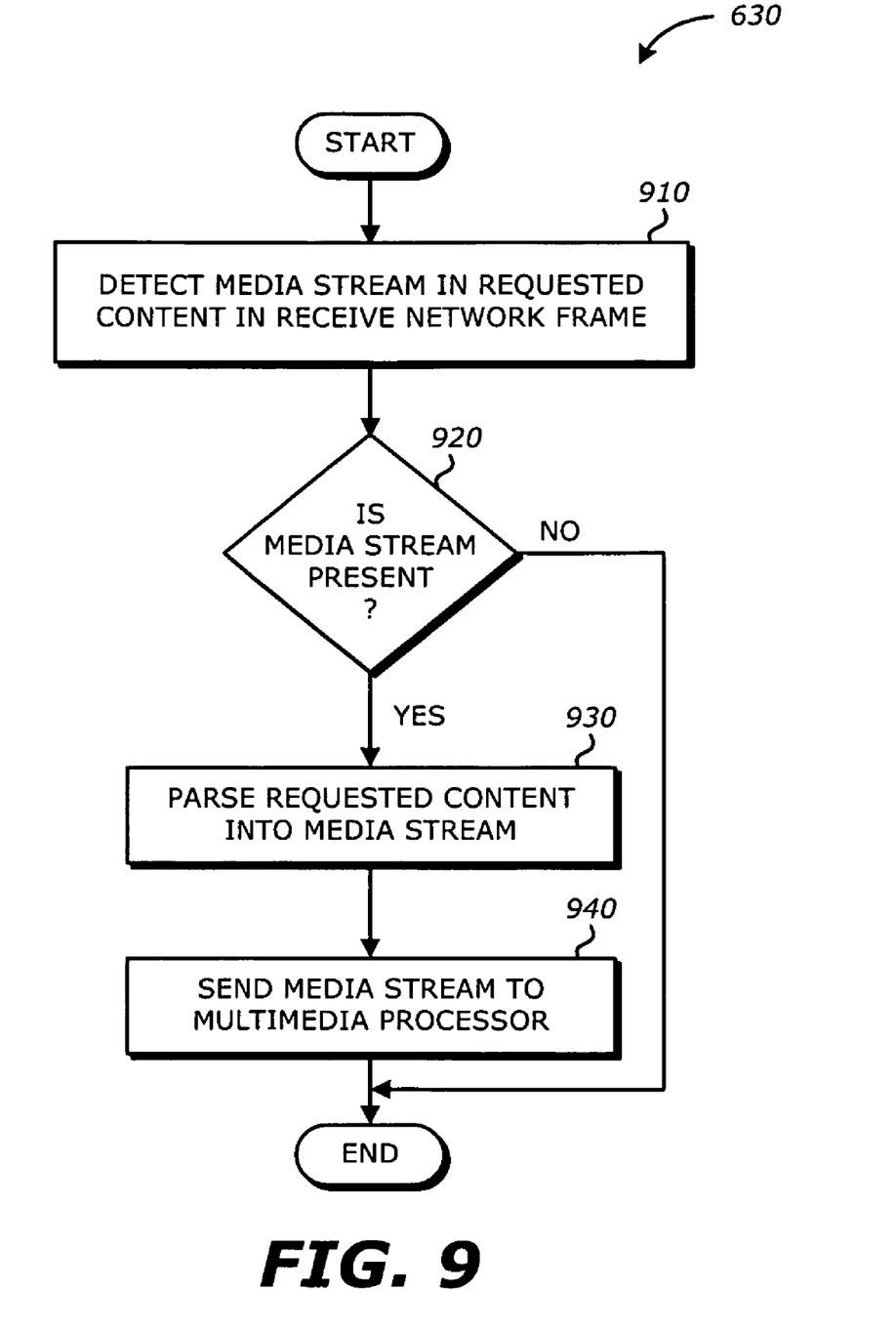
FIG. 9 is a flowchart illustrating a process to extract media streams according to one embodiment.

FIG. 9 is a flowchart illustrating the process 630 shown in FIG. 6 to extract media streams according to one embodiment.

Upon START, the process 630 detects the media stream in the requested content in the receive network frame (Block 910). This may be performed by examining the header information in the receive network frame. Next, the process 630 determines if the media stream is present in the receive network frame (Block 920). If not, the process 630 is terminated. Otherwise, the process 630 parses the requested content into the media stream (Block 930). This may be performed by examining the data format or organization in the header information. Next, the process 630 sends the media stream to the multimedia processor for processing (Block 940). The process 630 is then terminated.

Figure 10:
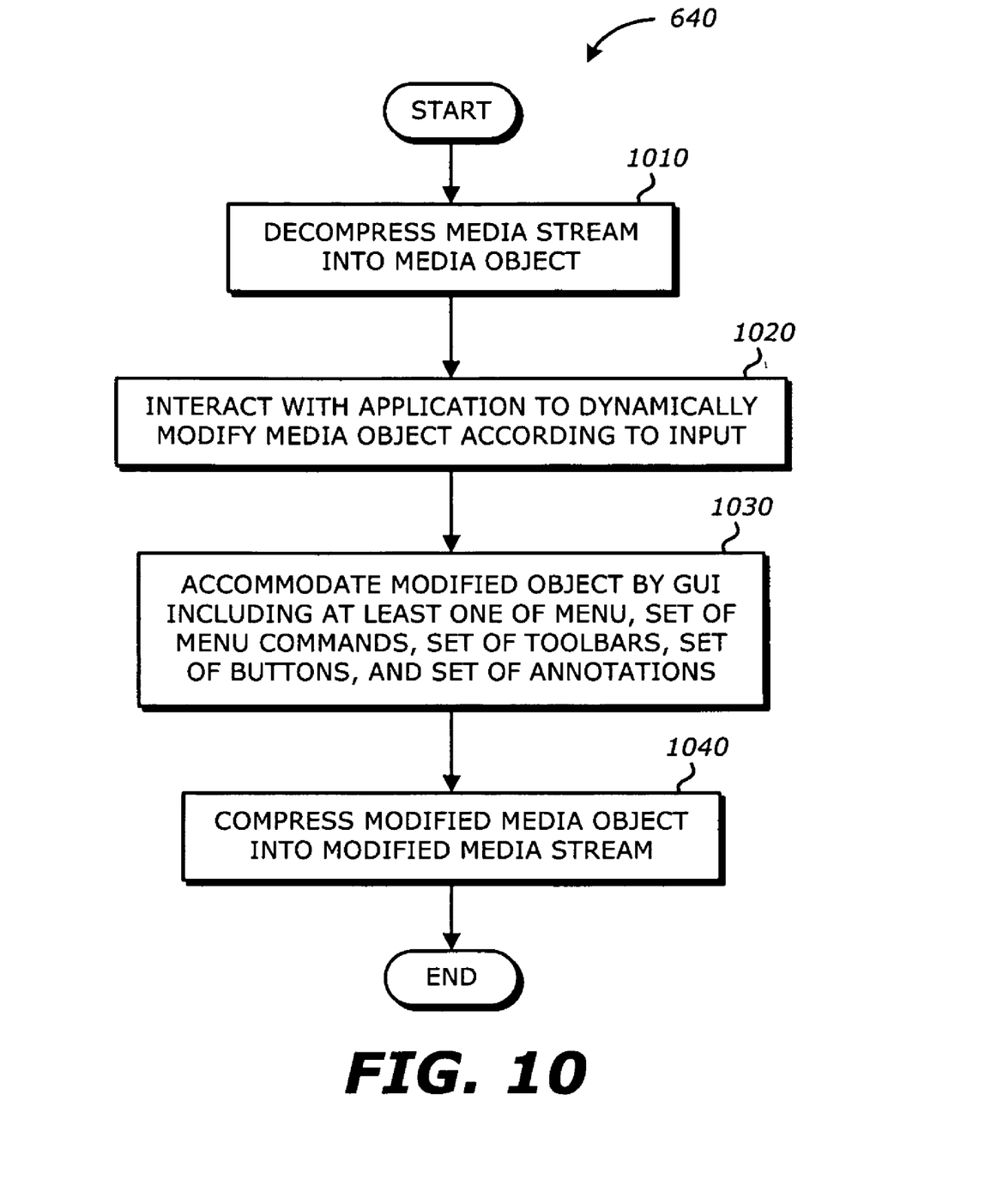
FIG. 10 is a flowchart illustrating a process to dynamically modify the media streams according to one embodiment.

FIG. 10 is a flowchart illustrating the process 640 to dynamically modifying the media streams shown in FIG. 6 according to one embodiment.

Upon START, the process 640 de-compresses the media stream into a media object according to the de-compression format or standard (Block 1010). This may be performed by an entropy decoding (e.g., a run-length decoding, Huffman decoding), an inverse quantization, an inverse Discrete Cosine Transform (DCT), and a motion compensation. It may also include an AC decoding such as the CABAC decoding. Next, the process 640 interacts with an application to dynamically modify the media object (Block 1020). This may include any additional processing on the media object such as overlaying advertisements, highlighting a region on the video, etc. Then, the process 640 accommodates the modified object by a GUI including at least one of a menu, a set of menu commands, a set of toolbars, a set of buttons, and a set of annotations (Block 1030). This may be performed by overlaying the graphics of the GUI on the media if necessary.

Next, the process 640 compresses the modified media object into the modified media stream (Block 1040). This may include calculating intra-frame and inter-frame residues, a motion estimation, calculating the DCT, quantization of the DCT coefficients, and an entropy encoding (e.g., run-length encoding, Huffman encoding). It may also include an AC encoding such as the CABAC encoding. The process 640 is then terminated.

Elements of one embodiment may be implemented by hardware, firmware, program instructions stored in a non-transitory computer-readable storage medium, or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in program instructions or firmware, the elements of an embodiment are essentially program instructions that perform the necessary tasks. The program instructions and firmware may include the actual code to carry out the operations described in one embodiment, or code that emulates or simulates the operations.

The program or code segments can be stored in a processor or machine accessible medium. The "processor readable or accessible medium" or "machine readable or accessible medium" may include any medium that may store, transmit, receive, or transfer information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, program instructions stored in a non-transitory computer-readable storage medium, or firmware, or any combination thereof. A hardware or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also involve program instructions that implement a software driver or interface that interacts with the operating system running on the platform. A module may also be a hardware driver to configure, set up, initialize, send and receive data to and from a hardware device. An apparatus may include combinations of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus comprising:

a network interface to interface with a client and a server, wherein the apparatus is distinct from the client and the server, wherein the client requests content from the server via the apparatus to ensure that, a media stream sent to the client is routed via the apparatus, wherein the network interface receives an input from the client requesting a modification of the content requested from the server via a network plug-in interface on the client;

a network processor coupled to the network interface that analyzes data received from the server to extract the media stream from the requested content, wherein analyzing the data involves detecting the media stream within the requested content and determining the type of the media stream; and a multimedia processor coupled to the network processor to dynamically modify the media stream in real-time according to the input from the client wherein the apparatus modifies media streams destined for multiple clients that include the network plug-in interface based on input from the multiple clients;

wherein the network plug-in interface on the multiple clients supports low-level basic actions that do not need to change; and
wherein the capabilities of the apparatus are upgraded to provide additional modification capabilities for media streams without installing or populating upgrade software and application plug-ins on the multiple clients.

2. The apparatus of claim 1 wherein the network interface comprises:
a client interface to interface with the client via the network plug-in interface, the client interface receiving the input from the client and transmitting the modified media stream to the client; and
a server interface to receive a receive network frame containing the requested content from the server via a network, the server interface sending the receive network frame to the network processor.

3. The apparatus of claim 2 wherein the network processor comprises:
a media detector to detect the media stream in the requested content in the receive network frame;
a media parser coupled to the media detector to parse the requested content into the media stream, the parsed media stream being sent to the multimedia processor;
an encapsulator coupled to the multimedia processor to encapsulate the modified media stream into the transmit network frame; and
a client interaction module coupled to the encapsulator to interact with the client.

4. The apparatus of claim 3 wherein the client interaction module comprises:
an event handler to handle an event caused by the input from the client;
a platform configuration processor coupled to the event handler to configure the platform of the client according to the input from the client; and
a web page interface coupled to the platform configuration processor to transmit a transmit network frame containing the modified media stream to the client according to the event and the configured platform.

5. The apparatus of claim 4 wherein the client interaction module further comprises:
a buffer coupled to the event handler to buffer the event.

6. The apparatus of claim 1 wherein the multimedia processor comprises:
a de-compressing processor to de-compress the media stream into a media object;
an application logic module to interact with an application to dynamically modify the media object; and
a compressing processor coupled to the application interface to compress the modified media object into the modified media stream.

7. The apparatus of claim 4 wherein the event includes at least one of a mouse click, a key press, a cursor adjustment.

8. The apparatus of claim 6 wherein the application logic module comprises a GUI accommodating the modified object, the GUI including at least one of a menu, a set of menu commands, a set of toolbars, a set of buttons, and a set of annotations.

9. The apparatus of claim 2 wherein the network frame is an Ethernet frame.

10. The apparatus of claim 1, wherein dynamically modifying the media stream comprises adding additional information or advertising content to the media stream.

11. The apparatus of claim 1, wherein dynamically modifying the media stream comprises deleting information or advertising content from the media stream.

12. The apparatus of claim 1, wherein dynamically modifying the media stream comprises moving a portion of the content in the media stream.

13. The apparatus of claim 1, wherein dynamically modifying the media stream comprises, based upon the input, highlighting a portion of the content in the media stream.

14. A method comprising:
interfacing with a client and a server, wherein the client requests content from the server via an apparatus that is distinct from the client and the server to ensure that a media stream sent by the server to the client is routed via the apparatus;
interacting with the client, wherein interacting comprises receiving an input from the client via a network plug-in interface on the client, and wherein the input requests a modification of the content from the server;
analyzing data received from the server to extract the media stream from the requested content, wherein analyzing the data involves detecting the media stream within the requested content and determining the type of the media stream; and
dynamically modifying the media stream in real-time according to the input from the client;
wherein the apparatus modifies media streams destined for multiple clients that include the network plug-in interface based on input from the multiple clients;
wherein the network plug-in interface on the multiple clients supports low-level basic actions that do not need to change; and
wherein the capabilities of the apparatus are upgraded to provide additional modification capabilities for media streams without installing or populating upgrade software and application plug-ins on the multiple clients.

15. The method of claim 14 wherein interfacing with the client and the server comprises:
interfacing with the client via the network plug-in interface to receive the input from the client and transmit the modified media stream to the client; and
receiving a receive network frame containing the requested content from the server via a network.

16. The method of claim 14 wherein interacting with the client comprises:
handling an event caused by the input from the client;
configuring the platform of the client according to the input from the client; and
transmitting a transmit network frame containing the modified media stream to the client according to the event and the configured platform.

17. The method of claim 16 wherein interacting with the client further comprises:
buffering the event in a buffer.

18. The method of claim 16 wherein transmitting the transmit network frame comprises:
encapsulating the modified media stream into the transmit network frame.

19. The method of claim 15 wherein extracting the media stream comprises:
detecting the media stream in the requested content in the receive network frame; and
parsing the requested content into the media stream.

20. The method of claim 14 wherein dynamically modifying the media stream comprises:
de-compressing the media stream into a media object;
interacting with an application to dynamically modify the media object; and
compressing the modified media object into the modified media stream.

21. The method of claim 16 wherein the event includes at least one of a mouse click, a key press, a cursor adjustment.

22. The method of claim 16 wherein dynamically modifying the media streams further comprises accommodating the modified object by a graphical user interface (GUI) including at least one of a menu, a set of menu commands, a set of toolbars, a set of buttons, and a set of annotations.

23. A system comprising:
a client having a network plug-in interface, the client requesting content from a server; and
a dynamic data processing unit coupled to the client and a server via a network, wherein the dynamic data processing unit is distinct from the client and the server, the dynamic data processing unit comprising:
a network interface to interact with the client and the server, wherein the server sends a media stream to the client via the dynamic data processing unit, wherein the client requests content from the server via the dynamic data processing unit to ensure that the media stream sent to the client is routed via the dynamic data processing unit, wherein the network interface receives an input from the client via the network plug-in interface requesting a modification of the content from the server,
a network processor coupled to the network interface that analyzes data received from the server to extract the media stream from the requested content, wherein analyzing the data involves detecting the media stream within the requested content and determining the type of the media stream, and
a multimedia processor coupled to the network processor that dynamically modifies the media stream in real-time according to the input from the client
wherein the dynamic data processing unit modifies media streams destined for multiple clients that include the network plug-in interface based on input from the multiple clients;
wherein the network plug-in interface on the multiple clients supports low-level basic actions that do not need to change; and
wherein the capabilities of the dynamic data processing unit are upgraded to provide additional modification capabilities for media streams without installing or populating upgrade software and application plug-ins on the multiple clients.

* * * * *